United States Patent
Tan et al.

(10) Patent No.: US 6,747,651 B1
(45) Date of Patent: Jun. 8, 2004

(54) SYSTEM AND METHOD FOR CREATING BOUNDING VOLUME HIERARCHIES UTILIZING MODEL SIMPLIFICATION

(75) Inventors: Tiow Seng Tan, Singapore (SG); Ket Fah Chong, Singapore (SG); Kok Lim Low, Singapore (SG)

(73) Assignee: National University of Singapore (SG)

( * ) Notice: Subject to any disclaimer, the term of this patent is extended or adjusted under 35 U.S.C. 154(b) by 0 days.

(21) Appl. No.: 09/743,921
(22) PCT Filed: Jul. 16, 1999
(86) PCT No.: PCT/SG99/00078
§ 371 (c)(1),
(2), (4) Date: Apr. 4, 2001
(87) PCT Pub. No.: WO00/04433
PCT Pub. Date: Jan. 27, 2000

(30) Foreign Application Priority Data

Jul. 18, 1998 (SG) .............................................. 9801823

(51) Int. Cl.[7] .............................................. G06T 15/70
(52) U.S. Cl. ........................ 345/474; 345/420; 345/426
(58) Field of Search ................................ 345/420, 423, 345/426, 440

(56) References Cited

U.S. PATENT DOCUMENTS 5,613,049 A    3/1997   Brechner et al.

FOREIGN PATENT DOCUMENTS

EP           0549944 A2      7/1993

OTHER PUBLICATIONS

Gottschalk et al., OBBTree: A Hierarchical Structure for Rapid Interference Detection, University of North Carolina, 1996, pp. 171–177.*

Klosowski et al., Efficient Collision Detection Using Bounding Volume Hierarchies of k–DOPs, IEEE, 1997, p. 21.*

Rossignac et al., Multi–Resolution 3D Approximations for Rendering Complex Scenes, IBM, 1993?, pp. 455–461.*

Goldsmith et al., Automatic Creation of Object Hierarchies for Ray Tracing, IEEE, 1987, pp. 14, 16.*

* cited by examiner

*Primary Examiner*—Mark Zimmerman
*Assistant Examiner*—Lance W Sealey
(74) *Attorney, Agent, or Firm*—Birch, Stewart, Kolasch, Birch, LLP

(57) ABSTRACT

This invention integrates model simplification and bounding volume hierarchy construction for collision detection in interactive 3D graphics. In particular, it provides general framework and a preferred method to construct bounding volume hierarchy using outputs of model simplification. Simplified models, besides their application to multi-resolution rendering, can provide clues to the shape of the input object. These clues help in the partitioning of the object's model into components that may be more tightly bounded by simple bounding volumes. The framework and method naturally employ both the bottom-up and the top-down approaches of hierarchy building, and thus can have the advantages of both approaches. The framework and method includes the steps of simplified models generation, component derivation, component tree generation, and bounding volume hierarchy generation. The operation of the method includes the steps of interactively computing, displaying and recording simplified models and bounding volume hierarchy in response to user commands. Ray tracing and collision detection may be efficiently performed using the bounding volume hierarchy generated by the invention.

22 Claims, 6 Drawing Sheets

PARTS FORMED DUE TO TRIANGLES:
  1. { $T_1$, $T_2$, $T_3$, $T_4$, $T_5$, $T_6$, $E_1$, $E_2$, $E_3$, $P_1$, $P_2$, $P_3$ }
  2. { $T_7$, $P_5$ }

PARTS FORMED DUE TO STRAY EDGES:
  3. { $E_4$, $P_6$ }

PARTS FORMED DUE TO REMAINING POINTS:
  4. { $P_4$ } though this application is the national phase under 35 U.S.C. §371 of PCT International Application No. PCT/SG99/00078 which has an International filing date of Jul. 16, 1999, which designated the United States of America.

SYSTEM AND METHOD FOR CREATING BOUNDING VOLUME HIERARCHIES UTILIZING MODEL SIMPLIFICATION

This application is the national phase under 35 U.S.C. §371 of PCT International Application No. PCT/SG99/00078 which has an International filing date of Jul. 16, 1999, which designated the United States of America.

CROSS REFERENCE TO RELATED APPLICATION

The subject matter of this application is related to U.S. application Ser. No. 09/065,488 filed Apr. 24, 1998, entitled "Multi-Resolution Graphic Representation Generated By Weight-Controlled Vertex Clustering For Interactive Visualization Applications" assigned to the assignee of this invention, and incorporated herein by reference.

FIELD OF THE INVENTION

The present invention relates generally to computer graphics and virtual reality. More specifically, the invention relates to systems and methods for generating bounding volume hierarchies for use in the checking of collisions among objects in complex interactive computer environments or in ray tracing computation to generate photo-realistic computer images.

BACKGROUND OF THE INVENTION

Fast rendering and collision detection are two fundamental goals of many interactive 3D graphics applications. Many realistic-looking 3D models, containing millions of polygons all of which may be visible in a complex scene, cannot be effectively rendered at interactive frame rates. A solution for this problem is to use multi-resolution or level-of-detail modeling, in which each object has a series of geometric approximations with increasingly lower rendering cost, while still resembling the original models from all directions. On the other hand, navigation in a complex scene requires extensive interference detection between models and thus needs support from very efficient collision detection data structures to achieve interactive frame rates.

There is an interest in interactive visualization and manipulation of architectural, mechanical and CAD models in applications such as computer simulation, computer game, object modeling, and virtual prototyping. Such applications may be standalone, distributed or over the world-wide-web. Systems and methods that detect collisions have been described in:

U.S. Pat. No. 5,572,634, "Method and Apparatus for Spatial Simulation Acceleration" issued to Jerome Duluk, Jr., Nov. 5, 1996;

U.S. Pat. No. 5,515,489, "Collision Detector Utilizing Collision Contours" issued to Larry Yaeger, May 7, 1996;

U.S. Pat. No. 4,888,707, "Object Collision Detection Method and Apparatus" issued to Kenji Shimada, Dec. 19, 1989;

European Patent No. 780798, "Method and Apparatus for Object Identification and Collision Detection in Three Dimensional Graphics Space" issued to Devic Goran, Jan. 7, 1998.

Systems and methods for utilizing spherical or voxel models of objects to assist collision detection in specific application areas are described in:

U.S. Pat. No. 5,548,694, "Collision Avoidance System for Voxel-Based Object Representation" issued to Sarah Frisken Gibson, Aug. 20, 1996;

U.S. Pat. No. 5,347,459, "Real Time Collision Detection" issued to Michael Greenspan et. al., Sep. 13, 1994;

U.S. Pat. No. 5,056,031, "Apparatus for Detecting the Collision of Moving Objects" issued to Masaru Nakano et. al., Oct. 8, 1991.

The above teachings concentrate on the process of collision detection and the applications to specific domains. On the other hand, the present invention is a method for processing an arbitrary collection of objects, in a simulated computer environment, into hierarchies of bounding volumes. The following teachings are most relevant to the present invention:

(1) U.S. Pat. No. 5,613,049, "Method for Creating Spatially Balanced Bounding Volume Hierarchies for Use in a Computer Generated Display of a Complex Structure" issued to Brechner et al., Mar. 18, 1997;

(2) G. Barequet, B. Chazelle, L. Guibas, J. Mitchell and A. Tal, "*BOXTREE:: A Hierarchical Representation for Surfaces in 3D*", Proceedings Eurographics '96, Vol. 15(3), pp. C-387–396, C-484, August 1996;

(3) S. Gottschalk, M. C. Lin and D. Manocha, "*OBBTree:: A Hierarchical Structure for Rapid Interference Detection*", Computer Graphics (SIGGRAPH '96 Proceedings), pp. 171–179, 1996;

(4) J. Klosowski, M. Held, J. Mitchell, H. Sowizral and K. Zikan, "*Efficient Collision Detection Using Bounding Volume Hierarchies of k-DOPs*", IEEE Transactions on Visualization and Computer Graphics, vol. 4 (1), 1998, pp 21–36.

Although the above documents provide significant advances in constructing good bounding volume hierarchies, there still remains many controversial design issues, such as top-down verses bottom-up construction approaches; choices between the types of bounding volumes, and various splitting rules for building the hierarchies (see, for example, Klosowski et. al.,1998). Some of these choices involve expensive computation. It is not readily apparent which choices are better.

Many popular approaches are based either on the hierarchies of bounding volumes that successively approximate parts of the input model until the exact geometry of the model is reached, or spatial decomposition of the space occupied by the model. Both ideas are aiming to reduce the number of pairs of objects or primitives that need to be checked for contact.

Besides collision detection, bounding volume hierarchies are also utilized to accelerate ray tracing process to generate photo-realistic computer images (see Arvo and Kirk, "A Survey of Ray Tracing Acceleration Techniques", in An Introduction to Ray Tracing, A. S. Glassner, ed., pp. 201–262, Academic Press, 1990). Relevant teachings include:

(1) J. Goldsmith and J. Salmon, "Automatic Creation of Object Hierarchies for Ray Tracing", IEEE Computer Graphics and Applications, vol. 7(5), pp.14–20, May 1987;

(2) I. Scherson and E. Caspary, "Data Structures and the Time Complexity of Ray Tracing", The Visual Computer, vol. 3, pp. 201–213, 1987 (see Section 5);

(3) A. Glassner, "Spacetime Ray Tracing for Animation", IEEE Computer Graphics and Applications, vol. 8(3), pp. 60–70, March 1988 (see pp. 62–63);

(4) F. Sillion and G. Drettakis, "Feature-based control of Visibility Error: A Multi-Resolution Clustering Algorithm for Global illumination", Computer Graphics (SIGGRAPH'95 Proceedings), pp. 145–152, August 1995 (see pp. 149);

(5) K. Whang, J. Song, J. Chang, J. Kim, W. Cho, C. Park and 1. Song, "Octree-R: An Adaptive Octree for Efficient Ray Tracing", IEEE Transactions on Visualization and Computer Graphics, vol. 1(4), December 1995;

(6) U.S. Pat. No. 5,613,049, "Method for Creating Spatially Balanced Bounding Volume Hierarchies for Use in a Computer Generated Display of a Complex Structure" issued to Brechner et al., Mar. 18, 1997;

(7) K. Klimaszewski and T. Sederberg, "Faster Ray Tracing Using Adaptive Grids", IEEE Computer Graphics and Applications, vol. 17(1), pp. 42–51, 1997.

In Kay and Kajiya, "Ray Tracing Complex Scenes", Computer Graphics (SIGGRAPH'86 Proceedings), pp. 269–278, August 1986 (see Section 3.1), the authors mentioned several interrelated properties that would seem to distinguish a good hierarchy from a bad one. These include (i) any given sub-tree in the hierarchy should contain objects that are near each other; (ii) the bounding volume of each node should be minimal; (iii) the sum of all bounding volume should be minimal; and (iv) the construction of the tree should concentrate on the nodes nearer the root of the tree. To date, finding close to optimal hierarchy remains a partially solved problem.

SUMMARY AND OBJECTS OF THE INVENTION

It is thus an object of this invention to provide a new system and method to generate effective bounding volume hierarchy. The current invention exploits shape information obtainable from simplified models to partition input model into its natural components so as to generate effective bounding volume hierarchy.

Specifically the inventive method includes first a step of generating simplified models; second, deriving various components of the input model from clues in simplified models; third, joining various components into a hierarchy to form the top few levels of the eventual bounding volume hierarchy; and then finally partitioning parts of each minimal sub-component into the bounding volume hierarchy.

This invention can be used to build a software system or an apparatus that generates effective bounding volume hierarchies for checking collision in interactive computer applications or for ray tracing process to generate photo-realistic images. Such software systems may already have methods to construct simplified models for the same application and, thus, overhead due to simplification needed by the present invention is insignificant. Also, the inventive system is a framework that can incorporate other existing methods within its various embodiments.

This invention may also take the form of an article of manufacture. More specifically, the article of manufacture is a computer-usable medium, including a computer-readable program code embodied therein wherein the computer-readable code causes a computer to execute the inventive method.

Some of the previous teachings have experimental evidence indirectly supporting the effectiveness and efficiency of the current invention. First, the invention is very careful in creating a hierarchy with all necessary considerations mentioned in Kay and Kajiya (1986). In particular, in the handling of the top-most few levels of the hierarchy in that they are a natural partition of the input model. On the whole, the current invention provides a framework that manages input models in a middle-in way to perform bottom-up to find the top few levels of the bounding volume hierarchy and top-down to find the lower levels. The middle-in approach is possible with the partitions derived through simplified models. This two-level structure capitalizes on the best features of both traditional top-down and bottom-up approaches, and can incorporate existing acceleration techniques applicable to both approaches.

Second, a different type of two level structure was suggested by Scherson and Caspary (1987) as their experiments concluded the need of such combined data structure. However, the authors did not provide an efficient computational method to derive such combined data structure. Glassner (1988) is yet another hybrid structure of "space subdivision, bounding volumes up" embedded together. This structure is different from our distinctive two-level structure, which is also applicable to individual objects and not just a big environment as is intended in Glassner (1988). It is understood that the top few levels of the hierarchy should be effective in guiding the search in the proper branches of the hierarchy as they are involved most of the time in the searching process. The previous teaching of achieving this using spatial subdivision, which is arbitrary regardless of the input model, is replaced in the current invention with component hierarchy which takes input model structure into consideration and thus can better guide searching.

Third, the basic theory given in Goldsmith and Salmon (1987) is exploited, in one embodiment of the invention, in a bottom-up manner in constructing the component hierarchy rather than the top-down manner as originally proposed. This way can better control the merging of sub-components, which is unlike the original faster method in Goldsmith and Salmon (1987) that is sensitive to the insertion order of bounding volumes.

Though slower than top down approach, the current invention is nevertheless efficient as it remains computational inexpensive as there are relatively few components to form a component hierarchy. Traditionally, bottom-up construction (though can better achieve criteria mentioned in Kay and Kajiya, 1986) appears to be more difficult than top-down in that clusters of polygons would have to be defined and grouped locally before they could be put together to form the bounding volume hierarchy. Such difficulty is solved in the current invention using shape information derived from simplified models.

Computationally expensive bottom-up constructions, with the traditional difficulty of clustering polygons mentioned above, are disclosed in Barequet et al. (1996) and U.S. Pat. No. 5,613,049. The former method combines two bounding volumes based on determining the minimum area (volume) among all combinations, whereas the latter on some resulting new bounding volume is no larger than certain predetermined percentage of the old bounding volumes. Another method similar in flavor to these last two methods is given in Sillion and Drettakis (1995). Also, another sophisticated and thus relatively high computational effort is the adaptive grids method disclosed by Klimaszewski and Sederberg (1997).

Fourth, the experiments conducted in using Octree-R by Whang et. al. (1995) concluded that Octree-R is more effective when the objects are non-uniformly distributed than when they are uniformly distributed (pp. 348). Besides extra computational effort, the Octree-R construction algorithm proposed may not find an optimal cutting plane as each axis is considered independently. The current invention can avoid this expensive computation, and is applicable and effective with a simple cutting plane as the data at each sub-component is uniformly distributed, though the whole input model may not be so.

The invention described herein satisfies the above-identified needs in the prior art by providing solutions. The invention provides methods and apparatuses to efficiently generate a good bounding volume hierarchy of an input computer environment to be utilized in collision detection in interactive 3D computer applications, such as computer simulations and computer games, and in ray tracing processes to generate photo-realistic images.

Specifically, the inventive method processes a collection of objects represented by polygons in a computer into a hierarchy of bounding volumes, from a root volume bounding all objects to sub-volumes bounding individual polygons or a small collection of polygons. Many details in the process of generating bounding volume hierarchies can be automated with the present invention and do not require user intervention.

The basic principle employed in this invention uses clues from simplified models to partition a given polygonal model of a complex environment into components, each with a tight bounding volume. Such partitioning can be viewed as a recognition of the shape of the input model, whose essence is captured well by a simplified model. The overall construction has the unique flavor of bottom-up in that polygons of models are distributed into various components, followed by top-down in that polygons within a component are partitioned recursively into smaller parts. This hybrid of top-down and bottom-up adapts itself very well to handle a diverse range of input models that some time favor top-down whereas at other times favor bottom-up.

The process of constructing bounding volume hierarchy is mostly automated, with minimal or no user intervention. Some automatic simplification algorithm is first applied to an input model to derive different level-of-details simplified models. Then, the simplified models are used to derive components, sub-components of components and so on of the input model. Polygons within each sub-component (containing no other sub-component) are further subdivided recursively into small collections of polygons, each with an associated bounding volume. Results of the above can be linked up, in a natural way, into a required bounding volume hierarchy.

Specifically, there is disclosed a method for execution by a data processor that prepares an input model into a bounding volume hierarchy. The framework includes the following steps:

Simplified Model Generation. Various simplified models of an input model are generated. The set of polygons, edges and points in a simplified model shows a sketch of the input model.

Component Derivation. Each simplified model, with polygons, edges and points, can be partitioned into parts that are to be used to guide the partition of the input model into components.

Component Tree Generation. Components and sub-components generated above can be arranged into a tree (such as a binary tree in one embodiment) of component hierarchies, forming the highest levels of the eventual bounding volume hierarchy.

Bounding Volume Hierarchy Generation. Each collection of polygons in each leaf of the component hierarchy is recursively partitioned into smaller collections of polygons and is connected to the component hierarchy into a resulting bounding volume hierarchy. Such bounding volume hierarchy is stored for subsequent use to assist collision detection in 3D interactive applications or ray-tracing processes.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE INVENTION

Figure 1:
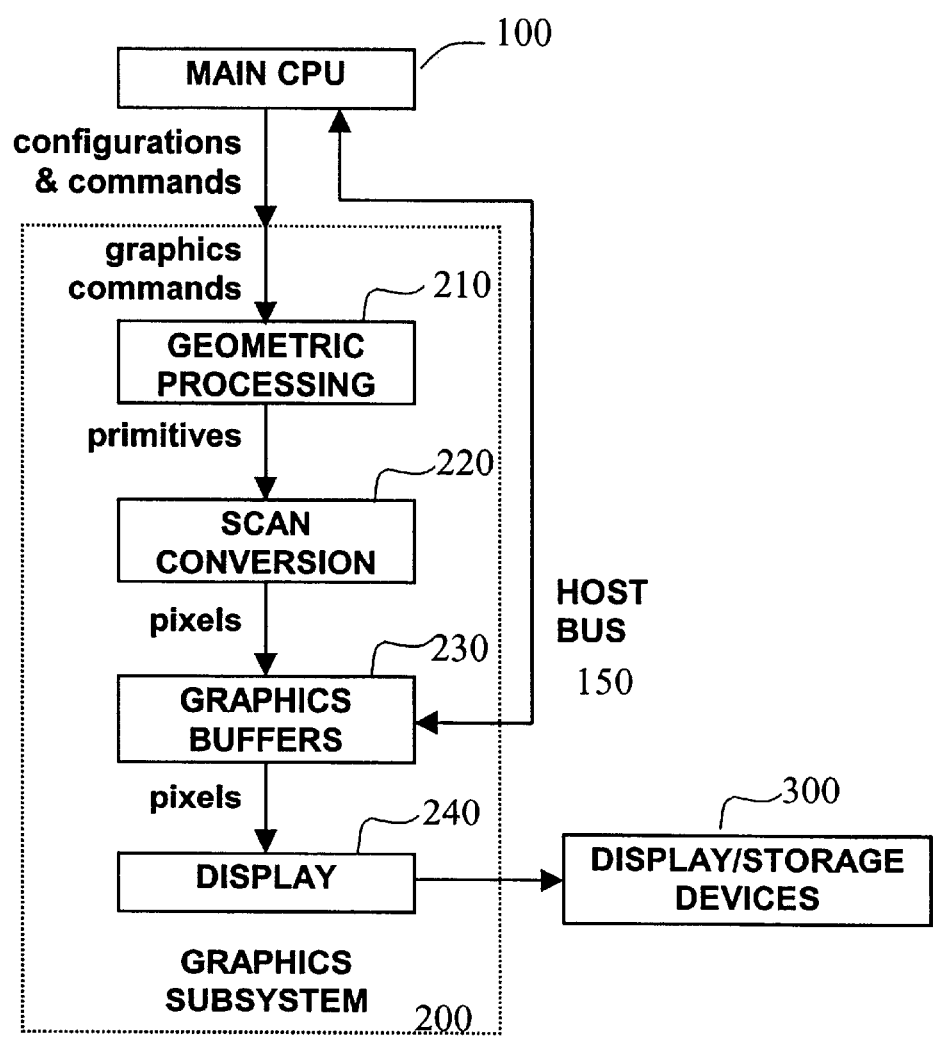
FIG. 1 is a block diagram of an exemplary raster graphics system.

FIG. 1 illustrates an exemplary raster graphics system, which includes a main (Host) central processing unit CPU 100 connected to a graphics subsystem 200. The Host processor 100 executes an application program and dispatches graphics tasks to the graphics subsystem 200. The graphics subsystem 200 outputs to a display device 300 connected thereto.

The graphics subsystem 200 includes a pipeline of several components that perform operations to prepare geometric entities for display on a raster display device 300. For the purposes of describing the invention, a model of the graphics subsystem is employed that contains the following functional units. It should be realized that this particular model is not to be construed in a limiting sense upon the practice of the invention.

A Geometric Processor unit 210 receives configurations and commands from the main CPU 100 to perform geometric and perspective transformations, exact clipping on primitives against screen (window) boundaries, as well as lighting computations. The resulting graphics primitives, e.g. points, lines, triangles, etc., are described in screen space (integral) coordinates.

A scan conversion (rasterization) unit 220 receives the graphics primitives from the geometric processor unit 210. Scan converter unit 220 breaks down the graphics primitives into raster information, i.e. a description of display screen pixels that are covered by the graphics primitives.

A graphics buffer unit 230 receives, stores, and processes the pixels from the scan conversion unit 220. The graphics buffer unit 230 may utilize conventional image buffers and a z-buffer to store this information.

A display driver 240 receives pixels from the graphics buffer unit 230 and transforms these pixels into information suitable for display on the output display device 300, typically a raster screen such as a cathode ray tube.

Figure 2:
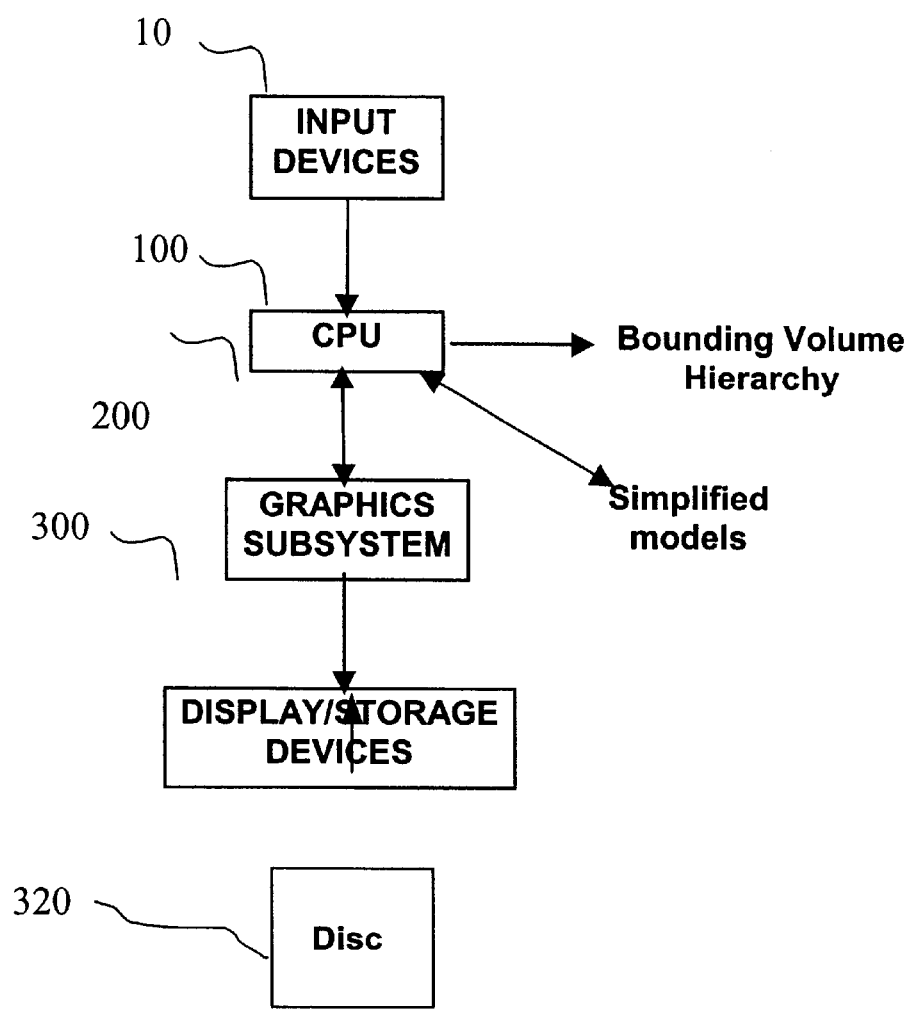
FIG. 2 is a block diagram of the raster graphics system of FIG. 1 that shows a memory for storing simplified models and bounding volume hierarchy.

FIG. 2 is a simplified diagram of a graphics processing system according to the invention. As shown in FIG. 2, an input device 10 inputs graphics data to be processed by the invention. The CPU 100 processes the input data from input devices 10 by executing an application program. CPU 100 also dispatches graphics tasks to the graphics subsystem 200 connected thereto. The output results (simplified models and bounding volume hierarchy) may then be stored and/or displayed by display/storage devices 300.

This invention may also take the form of an article of manufacture. More specifically, the article of manufacture is a computer-usable medium, including a computer-readable program code embodied therein wherein the computer-readable code causes a computer to execute the inventive method.

A computer diskette 320 which may be inserted into storage device 310 in FIG. 2 is an example of such a computer-usable medium. When the disc 320 is loaded into storage device 310, the computer-readable program code stored therein is transferred into the CPU 100. In this way, the CPU 100 may be instructed to perform the inventive methods disclosed herein.

Having described an exemplary graphics processing system that is suitable for use in practicing the invention, a description is now provided of a presently preferred method of bounding volume hierarchy construction. For the purposes of describing the invention, it is assumed that models are described in polygonal boundary representations. Models with curved surfaces are in general tessellated, i.e. approximated with planar polygons, for graphic purposes and thus also benefit from the simplification technique of the invention. Also, it is assumed, for simplicity, in the discussion that polygons of models are simply triangles; otherwise, additional processing can be carried out to triangulate polygons into triangles or, alternatively, to provide minor modification to the invention to replace triangles with general polygons.

Overview of the Method

Figure 3:
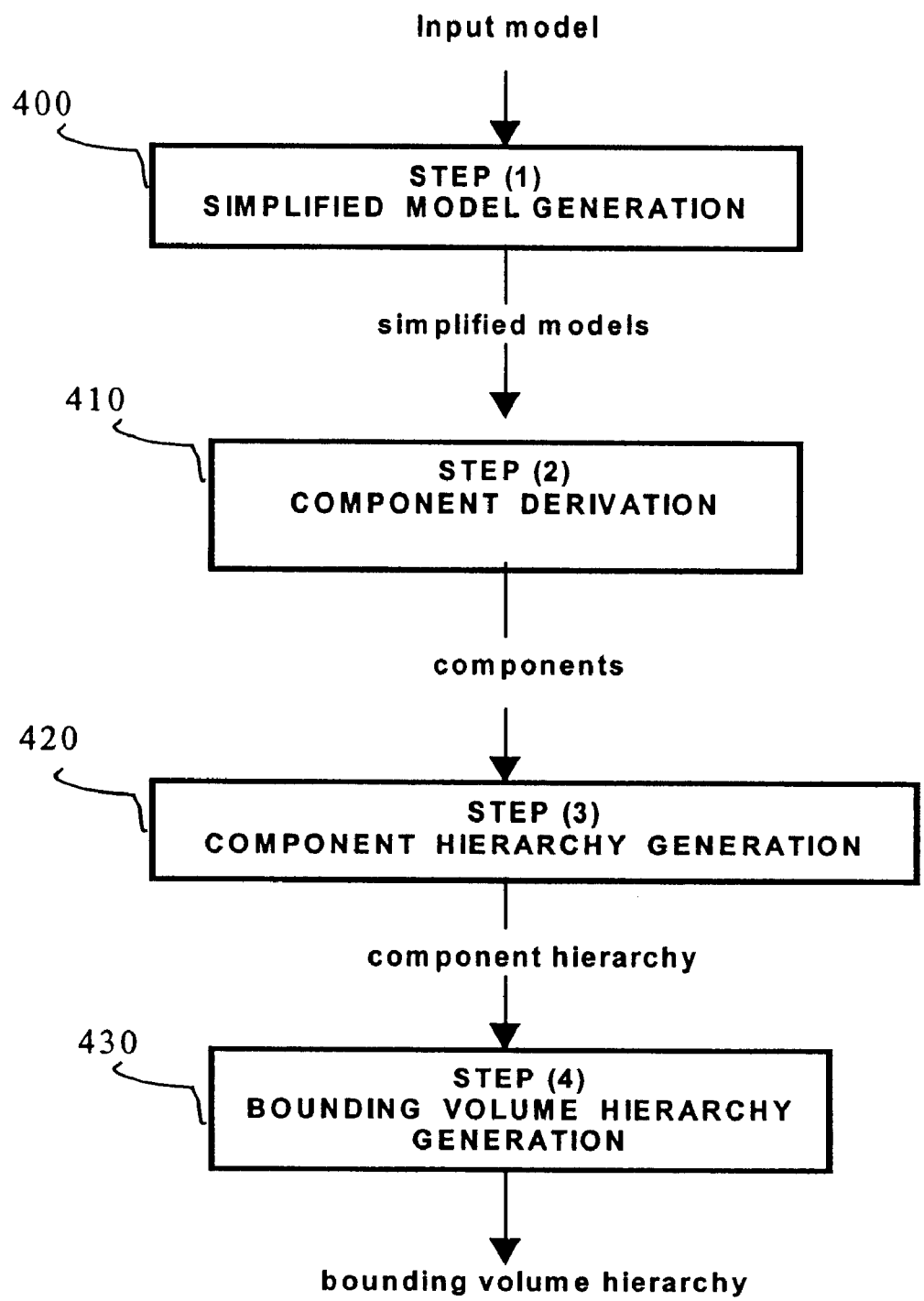
FIG. 3 is a flowchart that depicts the steps involved in the method of the invention.

The general framework includes the following steps: (1) a simplified model generation step 400, (2) a component derivation step 410, (3) a component tree generation step 420, and (4) a bounding volume hierarchy generation step 430. FIG. 3 is a flowchart that depicts the flow of these inventive steps.

In the framework, the outputs of model simplification are used to guide the construction of a bounding volume hierarchy for the input model. We will also call a bounding volume hierarchy a BV-tree.

(1) Simplified Model Generation Step 400

The input model is first passed to a model simplification process to generate a first simplified model of the lowest level of detail. This simplified model is usually drastically simplified from the input model.

(2) Component Derivation Step 410

For the first simplified model, its primitives are grouped into parts. For each part, a component of the original model is formed by collecting all the original polygons that simplify into the primitives in the part. These disjoint components form a partition of the original model. Note that a component is a subset of the original model's polygons.

(3) Component Tree Generation Step 420

Figure 4A:
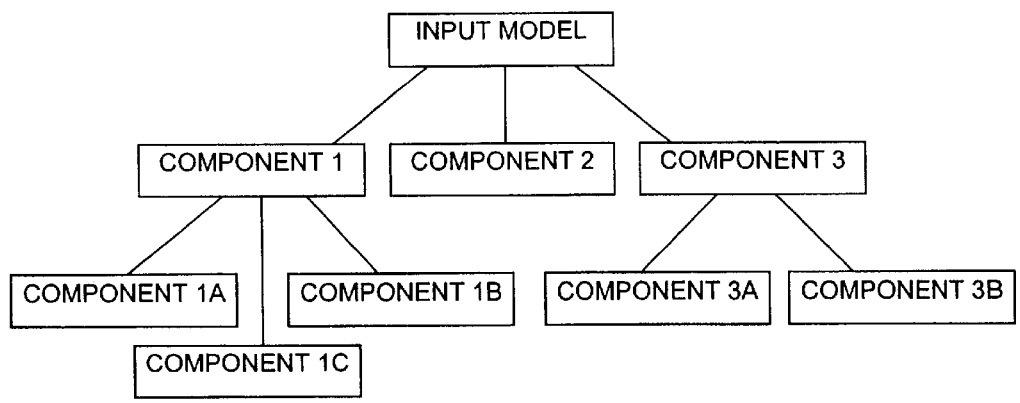
FIG. 4a is an example of a component tree constructed during the step of component tree generation in the framework.

The first-level components derived using the first simplified model in the above step can be further decomposed into sub-components in the same way by invoking the model simplification process again with higher level of detail than the first simplification. The results of the subsequent simplifications are then used by the step of component derivation to derive the sub-components. There are mainly two ways of invoking the higher level of detail simplification. In the first, the simplification is separately applied to each first-level component, whereas in the second, the simplification is applied to the entire original model. For the second way, some sub-component may not be a subset of any first-level component, i.e. it contains polygons that come from more than one first-level component. This can be resolved by breaking the sub-component into smaller sets such that every one of them is a subset of some first-level component. Each sub-component thus formed is then linked to the first-level component that is a superset of the sub-component. The further decomposition can be recursively applied to the sub-components. The result of this recursive partitioning is a component tree of the original model. FIG. 4a shows an example of a component tree.

Figure 4B:
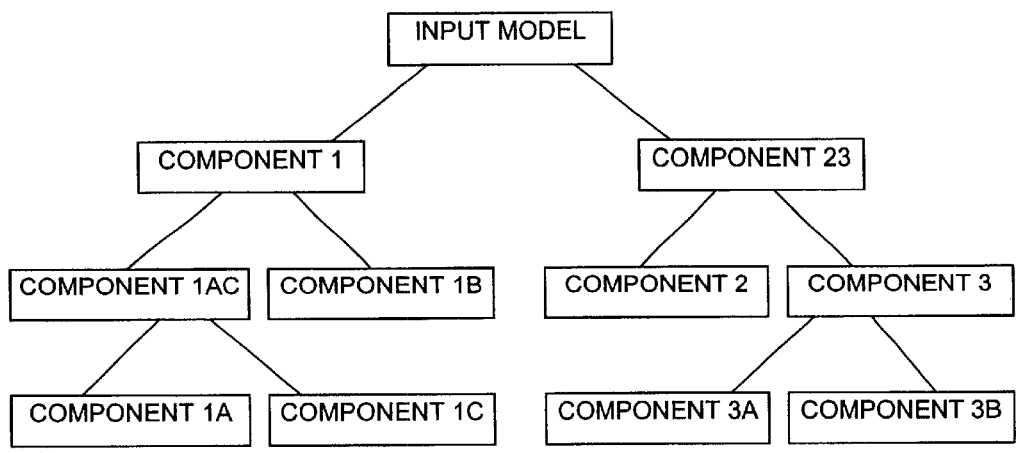
FIG. 4b is a binary component tree converted from the component tree of FIG. 4a during the step of component tree generation in the framework.

A component tree can be viewed as the topmost levels of a bounding volume hierarchy. However, due to the possibly many number of components generated for each node in the component tree, the degree (which is the maximum number of children over all the internal nodes of the component tree) of the BV-tree can be high. Since high degree may be harmful to the performance of collision detection, there is usually a need to convert the original tree to a low-degree tree. For each node in the tree, its components can be combined in a bottom-up manner to reduce the tree's degree. FIG. 4b shows a binary component tree converted from the original tree in FIG. 4a.

(4) Bounding Volume Hierarchy Generation Step 430

Figure 4C:
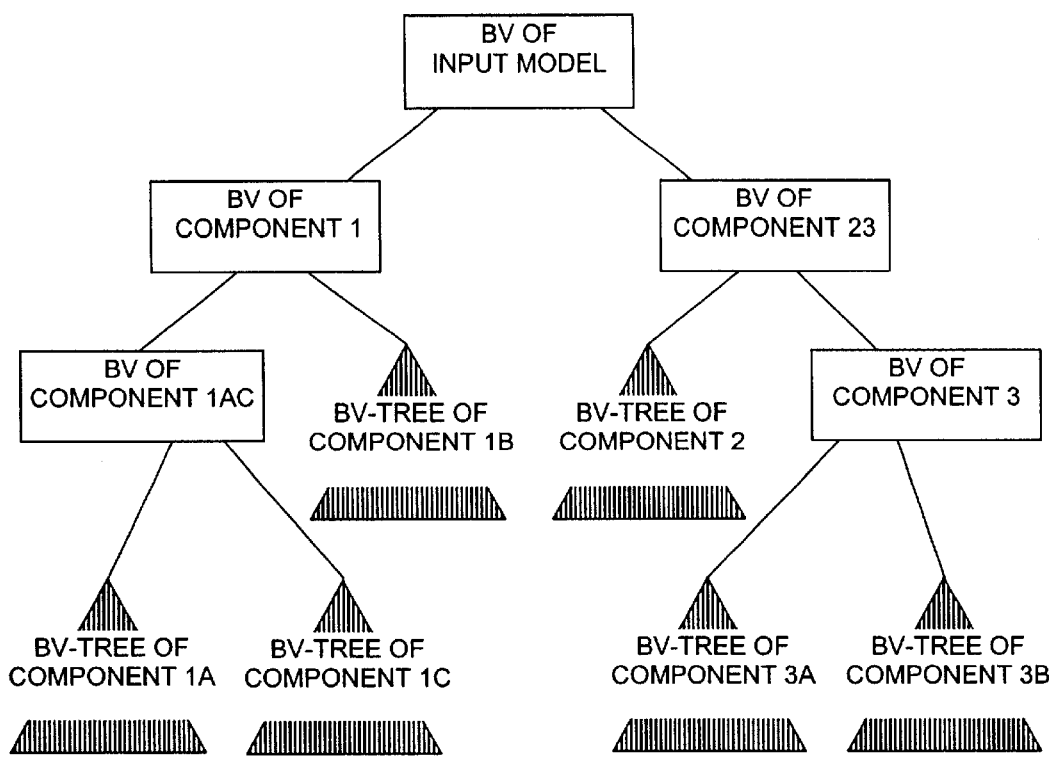
FIG. 4c is a final BV-tree constructed from the binary component tree of FIG. 4b during the step of bounding volume hierarchy generation in the framework.

The topmost levels of the BV-tree (which we will refer to as the upper BV-tree) is then derived from the new component tree by computing a bounding volume for each node in the component tree. In practice, the component decompositions are not performed down to the level where each leaf component is a single polygon. Therefore, in the next step of the framework, a traditional BV hierarchy building method is applied to each leaf component in the component tree. Each leaf component's BV-tree replaces the corresponding leaf in the upper BV-tree, and this completes the construction of the BV-tree for the input model. FIG. 4c shows a BV-tree constructed from the example component tree in FIG. 4b.

The framework has a few advantages. The information obtained from the simplified models can allow a BV-tree building process to better partition the original model into components that may be more tightly bounded by a pre-specified type of simple bounding volumes. Since the number of components is usually much smaller than the number of polygons in the input model, it is now affordable to use a more exhaustive bottom-up algorithm to perform the conversion of the component tree to one with a low specified degree. The above two factors allow more efficient computation of a BV-tree that is good in its topmost few levels.

Details of the Method

The presently preferred method that materializes the above-mentioned general framework is as described next.

(1) Simplified Model Generation Step 400

Recently, there has been much work done in automatic polygonal simplification algorithms. Some simplification algorithms are suitable for mesh models, which consists of a network of polygons forming a single, continuous surface, while some are suitable for more general polygonal models (e.g. polyhedral models) where arbitrary topology is allowed. These algorithms form a spectrum, ranging from fast, simple approaches with moderate fidelity to slower, more sophisticated methods with superb fidelity.

In one embodiment, the inventive simplification algorithm is based on vertex-clustering approach, as disclosed in U.S. application Ser. No. 09/065,488 filed Apr. 24, 1998, entitled "Multi-Resolution Graphic Representation Generated By Weight-Controlled Vertex Clustering For Interactive Visualization Applications" that is incorporated by reference above. This simplification is one of the few that is capable of handling general class of polygonal models. This simplification algorithm, herein, will be referred to as the floating-cell simplification (FCS) algorithm.

Recall that one of the objects of the invention is to be time-efficient. The overall time efficiency is very much affected by the speed of the simplification process. For this, the FCS algorithm has been chosen as it is very time-efficient. The FCS algorithm outputs simplified models that may contain triangles, edges and points. From the observations by the inventors, in many cases, the edges give the most important clues to the basic shape of the model. An edge represents an elongated part in the model, and once the elongated part is identified, a good way to bound it is to use a bounding volume that can be oriented to fit along the length of the elongated part. Oriented bounding boxes (OBBs) and oriented cylinders are examples of such suitable simple bounding volumes. In the preferred embodiment, OBBs have been chosen [S. Gottschalk, M. C. Lin and D. Manocha, "*OBBTree: A Hierarchical Structure for Rapid Interference* Detection", Computer Graphics (SIGGRAPH '96 Proceedings), pp. 171–179, 1996).

The set of triangles, edges and points in a simplified model shows a sketch of the model. Its vertices are also more uniformly distributed as compared to the original model. The success of the invention depends on simplification that produces drastically simplified models that show good sketches of the input model.

Equally important, the simplified models should be consistent across different levels of detail, since these consistencies affect the goodness of the recursive partitioning of components into sub-components. The FCS algorithm meets the above requirements, and thus can be utilized, as one possible embodiment, for our purposes. Other simplification algorithms such as that of M. Garland and P. Heckbert. *Surface Simplification Using Quadric Error Metrics.* Computer Graphics (SIGGRAPH '97 Proceedings), pp. 209–216, August 1997, may be adapted as other possible embodiments.

Note that FCS requires an input parameter of clustering cell width to determine the resolution of the simplified model. For many input models, due to their locally dense but globally sparse nature, the frequency distribution of the lengths of the edges indicates locations with drastic changes in frequencies. Such locations are good lengths for clustering cell widths. A simple algorithm can be designed to detect automatically a few of such locations to generate simplified models.

As mentioned, speed, quality and smoothness in transition are the basis for the choice of the FCS algorithm. Many other vertex and edge contraction simplification algorithms are generally slower, but have better output model quality. For the purposes of the subsequent steps, it is however unnecessary to obtain very high quality. More importantly, a simplification method must produce drastically simplified models containing clues, such as stray edges or triangles sharing no edges with others, to decompose the original model.

(2) Component Derivation Step 410

The invention uses outputs from the simplification step in the construction of a bounding volume hierarchy (termed BV-tree). The basic idea is to use clues from simplified models to partition a given polygonal model into components with tight bounding volumes.

Formally speaking: let T be the set of triangles of the input model M where ones desire to construct a BV-tree, called B(T). Each node v of B(T) corresponds to a subset $T_v$ of T, with the root node being associated with the full set T. Each internal node v of B(T) has two or more children in which their associated subsets form a partition of $T_v$. The maximum number of children for any internal node of B(T) is called the degree of B(T).

Associated with each node v of B(T) is a bounding volume, $b(T_v)$, that is an outer approximation to the set $T_v$ using a smallest instance of some specified class of shapes, e.g. axis-aligned bounding boxes (AABBs) [N. Beckmann, H. Kriegel, R. Schneider and B. Seeger. *The R\*-tree: An Efficient and Robust Access Method for Points and Rectangles.* Proceedings ACM SIGMOD International Conference on Management of Data, pp. 322–331, 1990.], spheres [P. Hubbard. *Approximating Polyhedra with Spheres for Time-critical Collision Detection.* ACM Trans. Computer Graphics, Vol. 15(3), pp. 179–210, July 1996], oriented bounding boxes [S. Gottschalk, M. C. Lin and D. Manocha. *OBBTree: A Hierarchical Structure for Rapid Interference Detection.* Computer Graphics (SIGGRAPH '96 Proceedings), pp. 171–179, 1996] and discrete orientation polytopes [J. Klosowski, M. Held, J. Mitchell, H. Sowizral and K. Zikan, "Efficient *Collision Detection Using Bounding Volume Hierarchies of* k-DOPs", IEEE Transactions on Visualization and Computer Graphics, vol.4(1), 1998, pp 21–36].

Furthermore, let T be the set of triangles in a polygonal model M. After simplification, each triangle of T is simplified to a point, an edge or remains as a (possibly different) triangle. Let S be the set of triangles, edges, and points of a simplified model m of M. Notice that all elements in S are open sets, i.e., each triangle does not contain the three edges on its boundary, and each edge does not contain the two points at its ends. Define $F_m: T \rightarrow S$ be the mapping such that $F_m(t)=s$ if and only if triangle $t \in T$ is simplified to an element $s \in S$.

First, S is partitioned into parts, and then the triangles in T are divided into components (with respect to m) so that $t_1$, $t_2$ belong to a same component if and only if $F_m(t_1)$ and $F_m(t_2)$ are in a same part of S. Intuitively, a part of S contains elements that are maximally connected among themselves as discussed next.

Define $S_3$, $S_2$, $S_1$ respectively as the set of triangles, edges, and points in S. First, consider the partition of $S_3$ into parts. Let R be a relation on $S_3$ such that a R b if and only if a can reach b by traversing the triangles in $S_3$ where two adjacent triangles in the traversal must share at least an edge. It is easy to check that R is reflexive, symmetric and transitive thus an equivalence relation and defines a unique partition on $S_3$. Then, for the purpose of having small total bounding volume of B(T), the edges of $S_2$ and the points of $S_1$ that exist in some triangles of $S_3$ are included into the respective parts in $S_3$. Also, each stray edge of $S_2$ (i.e. an edge not in any triangle of $S_3$) with both its endpoints in a same part is included into the part, since the bounding volume of the component corresponding to the part is likely to include the edge. Next, we consider the partition of the remaining elements in $S_2$. Each remaining stray edge is taken as a separate part. Also, each point that is an endpoint of a single stray edge can be grouped into the same part as the edge. Finally, each remaining point in $S_1$, isolated or incident upon by elements of different parts, forms an individual part. The following pseudo-code summarizes the above description.

Figure 5:
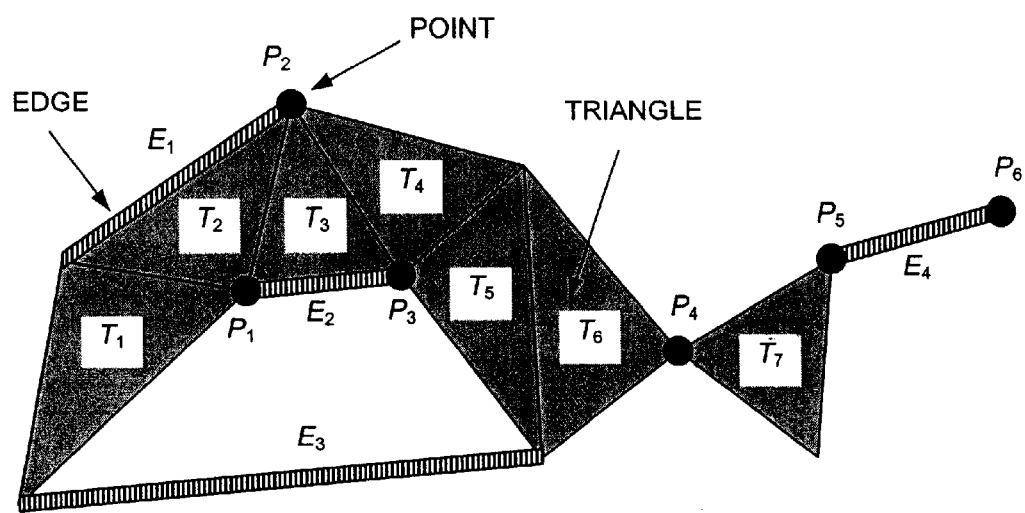
FIG. 5 shows the parts extracted from an example simplified model during the step of component derivation in the preferred method.
Figure 2:
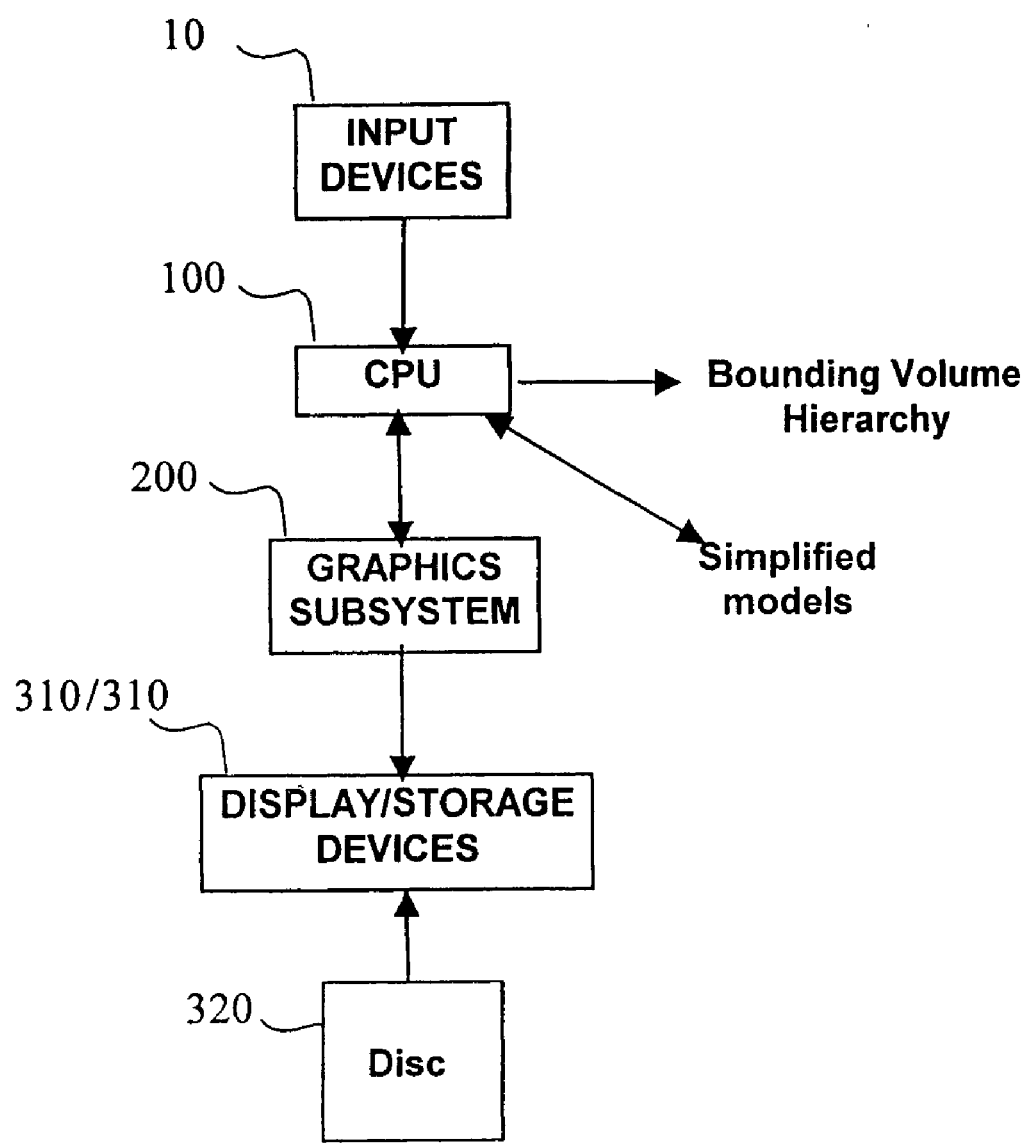

/* Initializations */
   $S_3$, $S_2$, $S_1$ are initialized, respectively, to the set of triangles, edges and points in S;
/* Step 2.1: Form parts due to triangles */
   do while $S_3 \neq \emptyset$
     P:={t} where t is any triangle in $S_3$;
     $S_3:=S_3-\{t\}$;
     do while $\exists t' \epsilon S_3$ where t' shares a side with some t$\epsilon$P
       P:=P$\cup$\{t\};
       $S_3:=S_3-\{t\}$;
     endDo;
     let $S'_2 \subseteq S_2$ whose every edge is a side of some triangle in P;
     let $S''_2 \subseteq S_2$ whose every edge is an isolated edge with both endpoints incident to some triangles in P;
     let $S'_1 \subseteq S_1$ whose every point is incident to some triangle in P but not any other triangle in S;
     Form a new part with P$\cup S'_2 \cup S''_2 \cup S'_1$;
     $S_2:=S_2-S'_2-S''_2$; $S_1:=S_1-S'_1$;
   endDo;
/* Step 2.2: Form parts due to stray edges */
   do while $S_2 \neq \emptyset$
     let e be an edge in $S_2$;
     let $S''_1 \subseteq S_1$ whose every point is an endpoint of e but not any other edge or triangle in S;
     Form a new part with {e}$\cup S''_1$;
     $S_2:=S_2-\{e\}$; $S_1:=S_1-S''_1$;
   endDo;
/* Step 2.3: Form parts due to remaining points */
   Form a new part each with each remaining point in $S_1$;

The above method outputs the same partition due to the defined equivalence relation. FIG. 5 shows the parts extracted by the above algorithm from an example simplified model. Also, simple data structures are sufficient, in particular, on keeping information about the triangles incident to each vertex. When given this, the algorithm runs in time linear to|S| The partition of S can be viewed as a shape of the input model.

A single application of the above algorithm divides T into various components. This can be recursively applied, each time with a simplified model of higher level of detail, to obtain sub-components of components and so on. To divide a component containing triangles $T_c \subseteq T$ using another simplified model m' of higher level of detail, the invention restricts the view of m' to only $F_{m'}(T_c)$.

In the above embodiment, step 410 makes each remaining vertex in $S_1$ a separate part. This can result in unnecessary many parts and thus many small components of the original model. In another embodiment, remaining vertices in step 410, if incident to some simplified edges or triangles, need not form a separate part. In such a case, triangles of original model that simplified to each such vertex can be distributed into components that derived from simplified edges or triangles incident by the vertex. One possibility is to use one or more partitioning planes cutting through the location of the vertex to distribute original triangles or duplicate them into the respective components. In the case of duplication, a triangle is considered being cut into pieces lying in the space of the respective components.

(3) Component Tree Generation Step 420

The components identified from T can naturally be arranged into a component tree C(T), in which each node represents a component, and its children, if any, represent the sub-components.

The component tree C(T) corresponds to the topmost levels of the whole bounding volume hierarchy of T, B(T). However, some nodes in C(T) may have many children and thus contribute to the high degree of the component tree. As it has been mentioned that high degree in a BV-tree may be ineffective for the purpose of collision detection, a few ways, as described below, can be used to convert C(T) into a binary tree before making it the topmost few levels of B(T).

The following discussion of the process makes reference to the children $v_i$ of each node v in C(T) for i=1, 2, . . . , k, where k is the number of children of v. Each child $v_i$ has an associated bounding volume and a set of triangles $T_i \subseteq T$ in its represented component. The bottom-up approach is adopted to construct a binary tree with leaves $v_i$ and root v. The method is similar to constructing a Huffman code tree. First, a pair of leaves, say $v_i$ and $v_j$, are chosen and combined into v', which now contains the set of triangles $T_i \cup T_j$ and has an associated bounding volume. Then, v' is treated as a new child in place of $v_i$ and $v_j$ in the set of children to repeat the process until only one child remains, which is the node v. It is natural to pick a pair where the resulting bounding volume of v' is minimum (for collision detection purposes) or surface-area of v' is minimum (for ray-tracing purposes). Though such an approach requires searching of the smallest bounding volume, it remains efficient and effective as the number of children is normally small.

In another embodiment, we use all triangles in the union of $T_i$(i=1, 2, . . . , k) to compute a partitioning halfplane and then assign each node $v_i$ to the halfspace containing most of its triangles. This can be applied recursively to each halfspace until when there is only one or a few $v_i$ in a subspace. The resulting tree obtained from the recursive partitioning will have nodes $v_i$ as the leaves and node v as the root of the component tree C(T).

Note that it seems that one can avoid such modification to C(T) if there are many more simplified models of different levels of detail, so that there are relatively small number of sub-components generated. However, such an approach can be problematic in that the constraint imposed by the higher levels on the lower levels may partition T into too many small components. Furthermore, it is difficult to guarantee a certain fixed number of sub-components from a component. Thus, it is a preferred method in this invention that only a small number of levels of detail are generated, and the method described in the previous two paragraphs is executed to arrange components into a binary tree or tree with low degree. In another embodiment, the following teachings can be adopted for the purpose of the invention: (1) Jeffrey Goldsmith and John Salmon, "Automatic creation of object hierarchies for ray tracing", IEEE Computer Graphics and Applications, vol 7(5), pp. 14–20, May 1987; (2) Francois Sillion and George Drettakis, "Feature-based control of visibility error: A multi-resolution clustering algorithm for global illumination", Computer Graphics (SIGGRAPH'95 Proceedings), pp. 145–152, August 1995.

Also, in the above embodiment, we first compute all the simplified models before the construction of B(T). In yet another embodiment, one possibility is to alternate between model simplification and construction of a level of C(T), where simplification is performed to triangles of components separately. The main advantage of this embodiment is the high consistency, but requires tight coupling between the steps of simplification and bounding volume generation.

(4) Bounding Volume Hierarchy Generation Step 430

Once the topmost few levels of B(T) has been computed from C(T), the remaining computation to complete B(T) can be carried out next on each leaf of B(T) using traditional object partitioning methods specific to the bounding volume type used or spatial partitioning techniques.

The generated bounding volume hierarchy data structure may be embodied within storage device 310. In this way a uniquely created data structure may take physical form within the storage device 310 and thereby configure the storage cells therein.

Performing Collision Detection

With the complete B(T), collision detection checking, for example, can be performed as usual: starting from the root r of the tree, to determine whether b(r) collides with the obstacle s (which can be another bounding volume) in question. If yes, explore children of r, with possibly the children of the obstacle s, and recurse.

Given two objects with bounding volumes $B(T_1)$ and $B(T_2)$ to determine their collisions (indicated by the first contact found), the following may occur. When they have no collision, there are either few (or none) bounding volumes intersections between $B(T_1)$ and $B(T_2)$, or many when the two objects have large number of primitives that are at close proximity. The former is easily detected without much computation, and the latter can also be handled efficiently with tight bounding volumes. On the other hand, when the two objects have collisions, there are either few bounding volume intersections, or many bounding volume intersections with many or few actual collisions. Out of these three, the first two can be handled efficiently in general. However, the third with few collisions requires careful organization of $B(T_1)$ and $B(T_2)$ to avoid long traversal before arriving at a positive detection, and it is non-trivial to handle this efficiently.

Interestingly, the computation of B(T) in the current invention has the effect of promoting triangles in that each part can be reached efficiently without involving other parts. The level of a triangle in B(T) is, thus, mainly dependent on the number of triangles to which the component belongs. In other words, triangles of the input model are no longer treated equally. Such an approach results in an unbalanced B(T). On the other hand, a balanced B(T), such as one created using spatial decomposition schemes, may result in a large total bounding volume and is thus not efficient for collision detection. The method of the current invention is similar to the way one should construct a bounding volume hierarchy for many individual items in a room by treating each item with a bounding volume rather than taking the whole room to partition recursively.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

What is claimed is:

1. A computer implemented method for successively approximating a collection of objects with a hierarchy of bounding volumes, from a root volume bounding all objects, to sub-volumes bounding individual objects or assemblies thereof, comprising:

inputting an original model approximating the objects;

generating one or more simplified models from the original model with each simplified model having fewer faces and vertices than the original model;

deriving sub-components of the objects using clues from the simplified models;

connecting the sub-components into a component hierarchy;

assigning the component hierarchy as a top few levels of the bounding volume hierarchy;

subdividing parts of the objects in each sub-component that are leaves in the component hierarchy into remaining levels of the bounding volume hierarchy; and configuring a memory device to embody the bounding volume hierarchy, wherein said step of deriving sub-components from the simplified models includes the substep of:

forming a sub-component from each of the parts consisting of all triangles of the original model simplified to elements in that part, the step of forming sub-components being repeated to further divide the sub-components into smaller sub-components using simplified models that are more detailed than that used to obtain the sub-component.

2. The method as set forth in claim 1, said generating step iteratively generating simplified models.

3. The method as set forth in claim 1, said generating step including the substeps of:

analyzing a frequency distribution of measurements of the objects to generate a plurality of clustering cell widths; and using the clustering cell widths to apply floating-cell clustering to generate the simplified models.

4. The method as set forth in claim 3, said analyzing substep analyzing the frequency distribution of edge lengths where each edge is counted only once.

5. The method as set forth in claim 3, said analyzing substep analyzing the frequency distribution of edge lengths where each edge is counted for each of the objects containing this edge.

6. The method as set forth in claim 1, said generating step including the substeps of:

generating error tolerant measures of the simplified models; and applying a simplification algorithm using the error tolerant measures to generate the simplified models.

7. The method as set forth in claim 1, said deriving step deriving sub-components from the simplified model including the substep of:

partitioning a set of triangles, a set of edges, and a set of points of the simplified model into parts.

8. The method as set forth in claim 7, wherein S consists of the set of triangles $S_3$, the set of edges $S_2$, and the set of points $S_1$, said partitioning step partitions S into parts including the substeps of:

forming parts from $S_3$ incorporating some $S_2$ and $S_1$;

forming parts from remaining $S_2$ incorporating some $S_1$; then forming parts from remaining $S_1$.

9. The method as set forth in claim 8, wherein said substep of forming parts from $S_3$ incorporating some $S_2$ and $S_1$ includes:

forming a new part with a triangle in $S_3$ that has not been assigned to any part, putting individual triangles that have not been assigned to any part into the new part if the individual triangle shares an edge with any triangle in the part;

including into the part edges in $S_2$, which are also edges of triangles in the part;

including into the part isolated edges in $S_2$ having both endpoints incident to some triangles in the part;

including into the part a vertex incident to some triangles in the part and not any other triangles not in the part; and repeating the forming, putting and including steps when there are still unassigned triangles in $S_3$.

10. The method as set forth in claim 8, wherein said substep of forming parts from remaining $S_2$ incorporating some $S_1$ includes:

forming a new part with an edge in $S_2$ that has not been assigned to any part;

including into the part each endpoint of the edge if the endpoint is not also an endpoint of any other edge or triangle in S; and repeating the forming and including substeps when there are still unassigned edges in $S_2$.

11. The method as set forth in claim 8, wherein said step of forming parts from remaining $S_1$ forms a part for each remaining point in $S_1$.

12. The method as set forth in claim 11, further comprising:

not forming a new part with points that are incident by existing parts; and distributing triangles of the original model simplified to the points to parts by utilizing a spatial partitioning scheme.

13. The method as set forth in claim 1, wherein said step of connecting sub-components into a component hierarchy includes top-down spatial partitioning of sub-components into a component hierarchy tree with a low degree.

14. The method as set forth in claim 1, wherein the step of connecting sub-components into a component hierarchy includes bottom-up merging of all sub-components of each sub-component into a component hierarchy tree with a low degree.

15. The method as set forth in claim 14 further including the step of using either a minimum area, a minimum volume, a number of triangles, a percentage of area or a percentage of volume, in deciding the merging of two sub-components into a bigger sub-component.

16. The method as set forth in claim 1, wherein the step of subdividing objects in each sub-component that are leaves in the component hierarchy includes top-down spatial partitioning of objects into a balanced bounding volume tree.

17. A machine having the memory device which embodies data representing the bounding volume hierarchy generated by the method of claim 1.

18. The method as set forth in claim 1, further comprising:

performing ray tracing by utilizing the bounding volume hierarchy.

19. The method as set forth in claim 1, further comprising:

performing collision detection between at least two of the objects by utilizing the bounding volume hierarchy.

20. An apparatus for successively approximating a collection of objects with a hierarchy of bounding volumes, from a root volume bounding all objects, to sub-volumes bounding individual objects or assemblies thereof, comprising:

means for inputting an original model approximating the objects;

means for generating one or more simplified models from the original model with each simplified model having fewer faces and vertices than the original model;

means for deriving sub-components of the objects using clues from the simplified models;

means for connecting the sub-components into a component hierarchy;

means for assigning the component hierarchy as a top few levels of the bounding volume hierarchy; and means for subdividing parts of the objects in each sub-component that are leaves in the component hierarchy into remaining levels of the bounding volume hierarchy, wherein said means for deriving sub-components from the simplified models includes:

means for forming a sub-component from each of the parts consisting of all triangles of the original model simplified to elements in that part, and means for further repeatedly dividing the sub-components into smaller sub-components using simplified models that are more detailed than that used to obtain the sub-component.

21. A computer implemented method for generating a bounding volume hierarchy data structure approximating a collection of objects, comprising:

inputting an original model approximating the objects;

generating one or more simplified models from the original model with each simplified model having fewer faces and vertices than the original model;

deriving sub-components of the objects using clues from the simplified models;

connecting the sub-components into a component hierarchy;

assigning the component hierarchy as a top few levels of the bounding volume hierarchy;

subdividing parts of the objects in each sub-component that are leaves in the component hierarchy into remaining levels of the bounding volume hierarchy; and configuring a memory device to embody the bounding volume hierarchy data structure, wherein said step of deriving sub-components from the simplified models includes the substep of:

forming a sub-component from each of the parts consisting of all triangles of the original model simplified to elements in that part, the step of forming sub-components being repeated to further divide the sub-components into smaller sub-components using simplified models that are more detailed than that used to obtain the sub-component.

22. An article of manufacture, comprising:

a computer-usable medium including computer-readable program code means, embodied therein, for causing a computer to generate a bounding volume hierarchy data structure approximating a collection of objects, the computer-readable program code means comprising:

computer-readable program code means for inputting an original model approximating the objects;

computer-readable program code means for generating one or more simplified models from the original model with each simplified model having fewer faces and vertices than the original model;

computer-readable program code means for deriving sub-components of the objects using clues from the simplified models;

computer-readable program code means for connecting the sub-components into a component hierarchy;

computer-readable program code means for assigning the component hierarchy as a top few levels of the bounding volume hierarchy; and computer-readable program code means for subdividing parts of the objects in each sub-component that are leaves in the component hierarchy into remaining levels of the bounding volume hierarchy, wherein said computer-readable program coed means of deriving sub-components from the simplified model includes:

means for forming a sub-component from each of the parts consisting of all triangles of the original model simplified to elements in that part and further repeatedly dividing the sub-components into smaller sub-components using simplified models that are more detailed than that used to obtain the sub-component.

* * * * *

UNITED STATES PATENT AND TRADEMARK OFFICE
CERTIFICATE OF CORRECTION

| | | |
|---|---|---|
| PATENT NO. | : 6,747,651 B1 | |
| APPLICATION NO. | : 09/743921 | |
| DATED | : June 8, 2004 | |
| INVENTOR(S) | : Tiow Seng Tan et al. | |

It is certified that error appears in the above-identified patent and that said Letters Patent is hereby corrected as shown below:

The sheet of drawing consisting of figure 2 should be deleted to appear as per attached figure 2.

In column 11, line 40, please replace [,] with --.--

In column 11, line 47, add a change [to|S|] to --to |S|.--

In column 12, lines 37-38, please replace [halfs-pace] with --half-space--

Signed and Sealed this

Eighteenth Day of July, 2006

JON W. DUDAS
*Director of the United States Patent and Trademark Office*